(12) United States Patent
Seegert et al.

(10) Patent No.: US 8,939,248 B2
(45) Date of Patent: Jan. 27, 2015

(54) UTILITY VEHICLE TRANSMISSION CONTROLS WITH COMMON PIVOT SHAFT

(75) Inventors: Brian David Seegert, Hartford, WI (US); William Thomas Ladwig, Beaver Dam, WI (US); Stephan R. Hayden, Sun Prairie, WI (US)

(73) Assignee: Deere & Company, Moline, IL (US)

( * ) Notice: Subject to any disclaimer, the term of this patent is extended or adjusted under 35 U.S.C. 154(b) by 447 days.

(21) Appl. No.: 13/090,673

(22) Filed: Apr. 20, 2011

(65) Prior Publication Data

US 2012/0266710 A1 Oct. 25, 2012

(51) Int. Cl.
*B60K 17/354* (2006.01)
*B60K 23/08* (2006.01)
*F16H 59/02* (2006.01)
*E02F 9/20* (2006.01)

(52) U.S. Cl.
CPC ............... *F16H 59/02* (2013.01); *E02F 9/202* (2013.01)
USPC .......... 180/247; 180/248; 180/249; 74/473.1; 74/473.3

(58) Field of Classification Search
CPC . F16H 59/10; F16H 59/0204; F16H 59/0278; F16H 59/105; F16H 59/02; F16H 2059/0239; F16H 59/70; F16H 59/08; F16H 63/18; F16H 61/32; F16H 61/24; F16H 61/22; B60K 17/344; B60K 17/35; B60K 17/3467; B60K 17/3462; B60K 17/3505; B60K 17/346; B60K 17/34; B60K 17/356; B60K 17/3515; B60K 17/3465; B60K 17/16; B60K 23/0808; B60K 23/08; B60K 23/04

USPC ............... 74/473.1, 473.19, 473.2, 473.3; 180/247, 248, 249

See application file for complete search history.

(56) References Cited

U.S. PATENT DOCUMENTS

| | | | | | |
|---|---|---|---|---|---|
| 2,955,483 | A | * | 10/1960 | Slomer | 74/480 R |
| 3,534,629 | A | * | 10/1970 | Schwerdhofer | 74/535 |
| 3,760,911 | A | * | 9/1973 | Porter et al. | 188/300 |
| 3,772,921 | A | * | 11/1973 | Carlson et al. | 74/7 A |
| 3,831,891 | A | * | 8/1974 | Jester | 248/514 |
| 3,972,249 | A | * | 8/1976 | Hansen | 74/526 |
| 4,187,730 | A | * | 2/1980 | Delorme | 74/54 |
| 4,335,876 | A | * | 6/1982 | Westernoff | 273/447 |
| 4,601,217 | A | * | 7/1986 | Teraoka et al. | 475/231 |
| 5,381,648 | A | * | 1/1995 | Seegert et al. | 56/17.1 |
| 5,537,892 | A | * | 7/1996 | Wiechman | 74/527 |
| 5,988,013 | A | * | 11/1999 | Carr et al. | 74/532 |
| 6,082,218 | A | * | 7/2000 | Osborn et al. | 74/502.4 |
| 6,460,421 | B1 | * | 10/2002 | Hasegawa et al. | 73/862.29 |
| 6,955,102 | B2 | * | 10/2005 | Kanbara et al. | 74/335 |
| 7,690,468 | B2 | * | 4/2010 | Nozaki et al. | 180/247 |
| 7,770,485 | B2 | * | 8/2010 | Suzuki | 74/471 R |
| 2001/0027690 | A1 | * | 10/2001 | Matsufuji et al. | 74/335 |
| 2004/0250649 | A1 | * | 12/2004 | Oota | 74/650 |
| 2007/0235242 | A1 | * | 10/2007 | Nozaki et al. | 180/247 |
| 2008/0210483 | A1 | * | 9/2008 | Takahashi et al. | 180/250 |

(Continued)

*Primary Examiner* — Justin Krause
*Assistant Examiner* — Alexander Vu

(57) ABSTRACT

Utility vehicle transmission controls include a common pivot shaft extending transversely across at least part of the operator station. The common pivot shaft has an integral collar. A shift lever has a sleeve pivotably mounted on the common pivot shaft with a portion of the sleeve extending over the integral collar. A differential lock lever has a lower end with a sleeve pivotably mounted on the common pivot shaft with a portion extending over the integral collar adjacent the shift pivot so that the shift lever and differential lock lever independently pivot.

14 Claims, 3 Drawing Sheets

(56) References Cited

U.S. PATENT DOCUMENTS

2009/0111629 A1* 4/2009 Kobara et al. ............... 474/111
2011/0017540 A1* 1/2011 King et al. ................... 180/249
2012/0266710 A1* 10/2012 Seegert et al. ............... 74/473.3

* cited by examiner

UTILITY VEHICLE TRANSMISSION CONTROLS WITH COMMON PIVOT SHAFT

FIELD OF THE INVENTION

This invention relates to transmission controls for a utility or off road vehicle, and more specifically to utility vehicle transmission controls having a common pivot shaft.

BACKGROUND OF THE INVENTION

Utility or off road vehicles may have two or more transmission control levers in the cab or operator station, such as a shift lever and a differential lock lever. For example, the shift lever may select vehicle direction and speed range for a belt driven continuously variable transmission. The differential lock lever may allow an operator to mechanically lock or unlock the rear differential. Each of the controls may include stamped or welded levers that pivot on transverse shafts, along with mechanical hardware or parts such as retainers, bushings and washers to hold the shafts and levers in place.

There is a need for reducing the number of components for utility vehicle transmission controls, and to simplify the mechanical hardware for the controls. There is a need for lower cost transmission controls for a utility vehicle, including reduced assembly costs.

SUMMARY OF THE INVENTION

Utility vehicle transmission controls include a shift lever having a shift grip and a rod extending between the shift grip and a stepped sleeve, a differential lock lever having a handle grip on a first end and a stepped sleeve on a second end, and a common pivot shaft on which the stepped sleeves are mounted to independently pivot. An integral collar on the common pivot shaft separates the stepped sleeves.

DESCRIPTION OF THE PREFERRED EMBODIMENT

Figure 1:
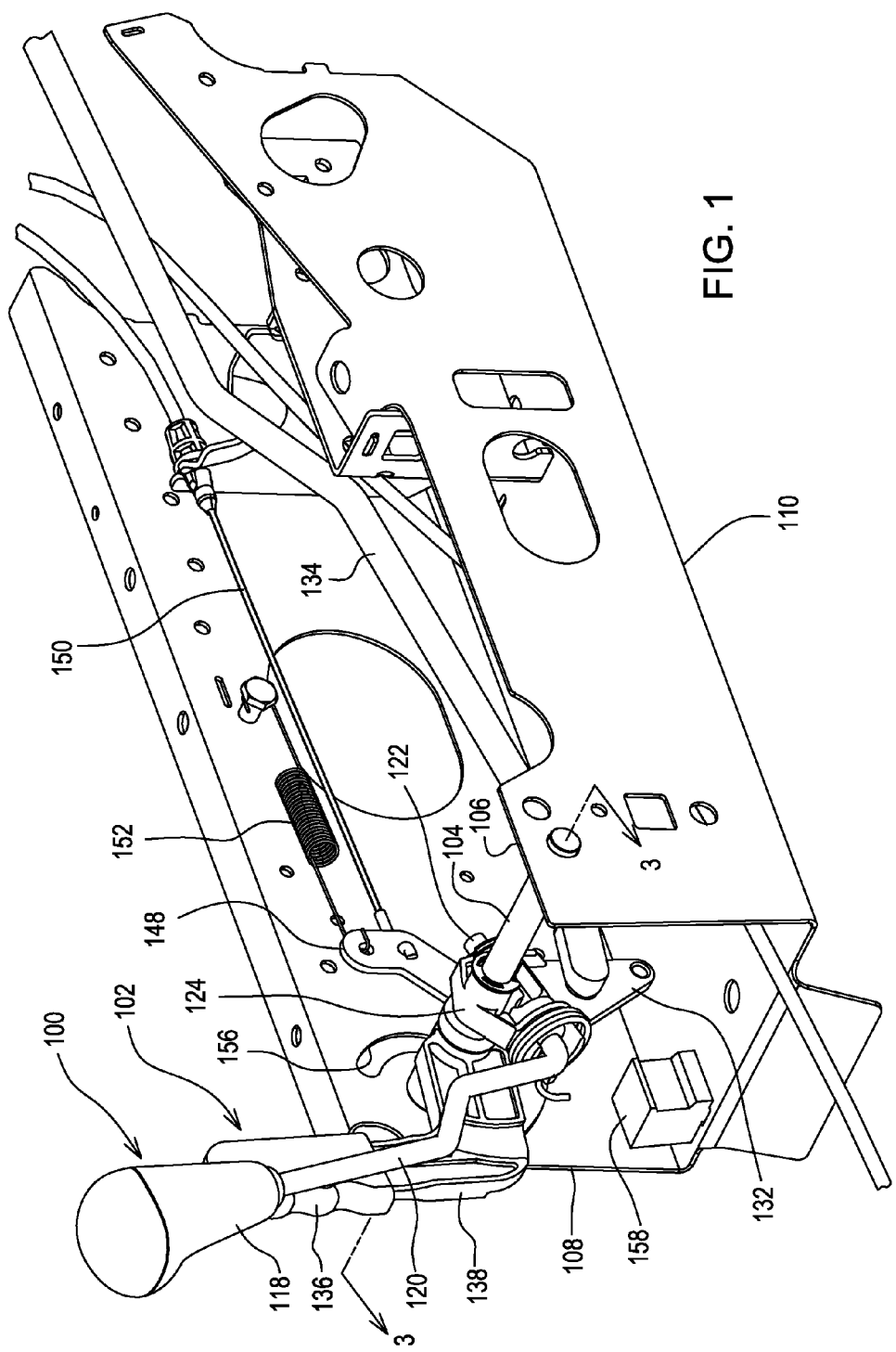
FIG. 1 is a perspective view of utility vehicle transmission controls having a common pivot shaft, with the differential lock in the locked position, according to a preferred embodiment of the invention.
Figure 2:
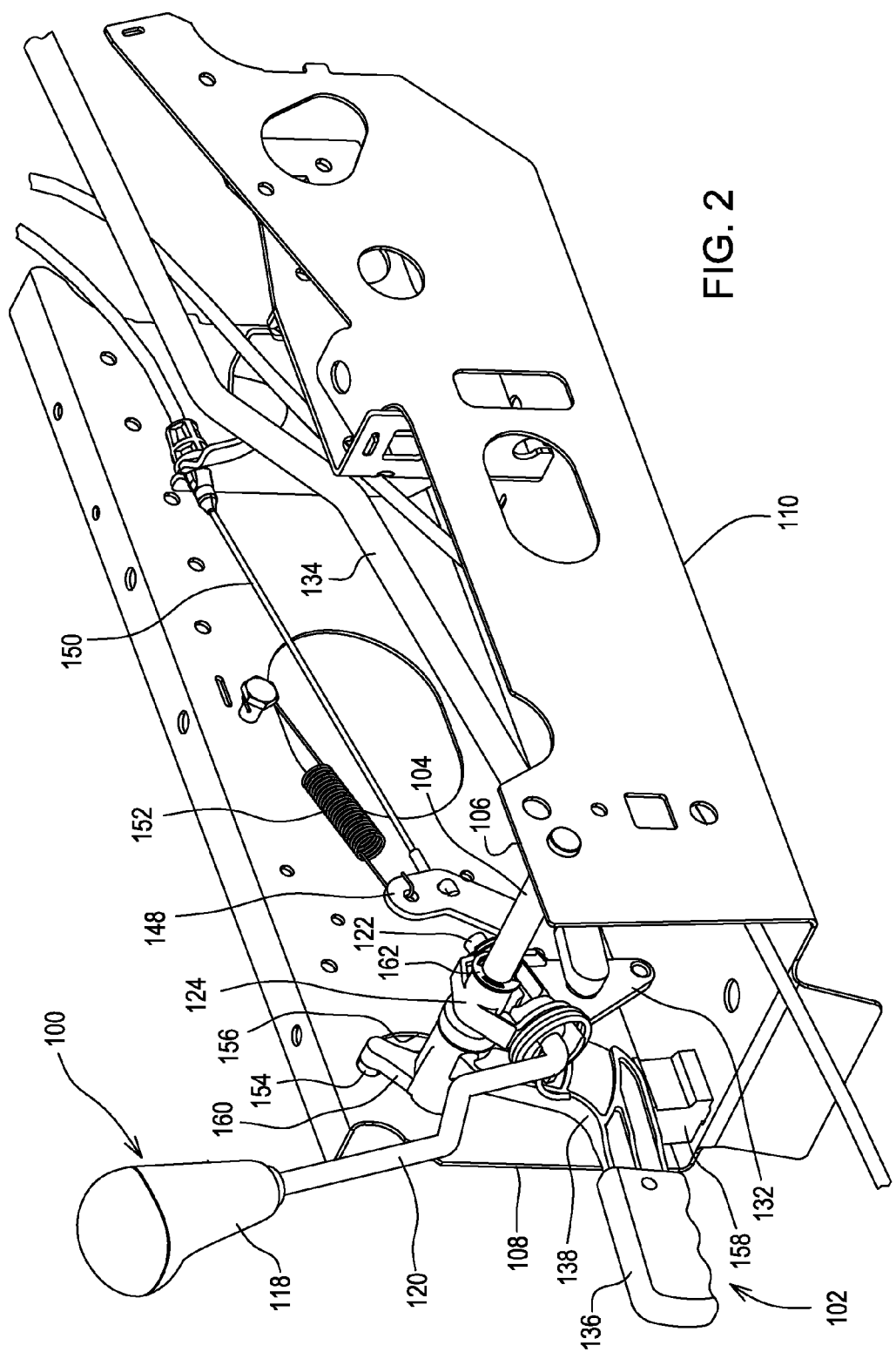
FIG. 2 is a perspective view of utility vehicle transmission controls having a common pivot shaft, with the differential lock in the unlocked position, according to a preferred embodiment of the invention.
Figure 3:
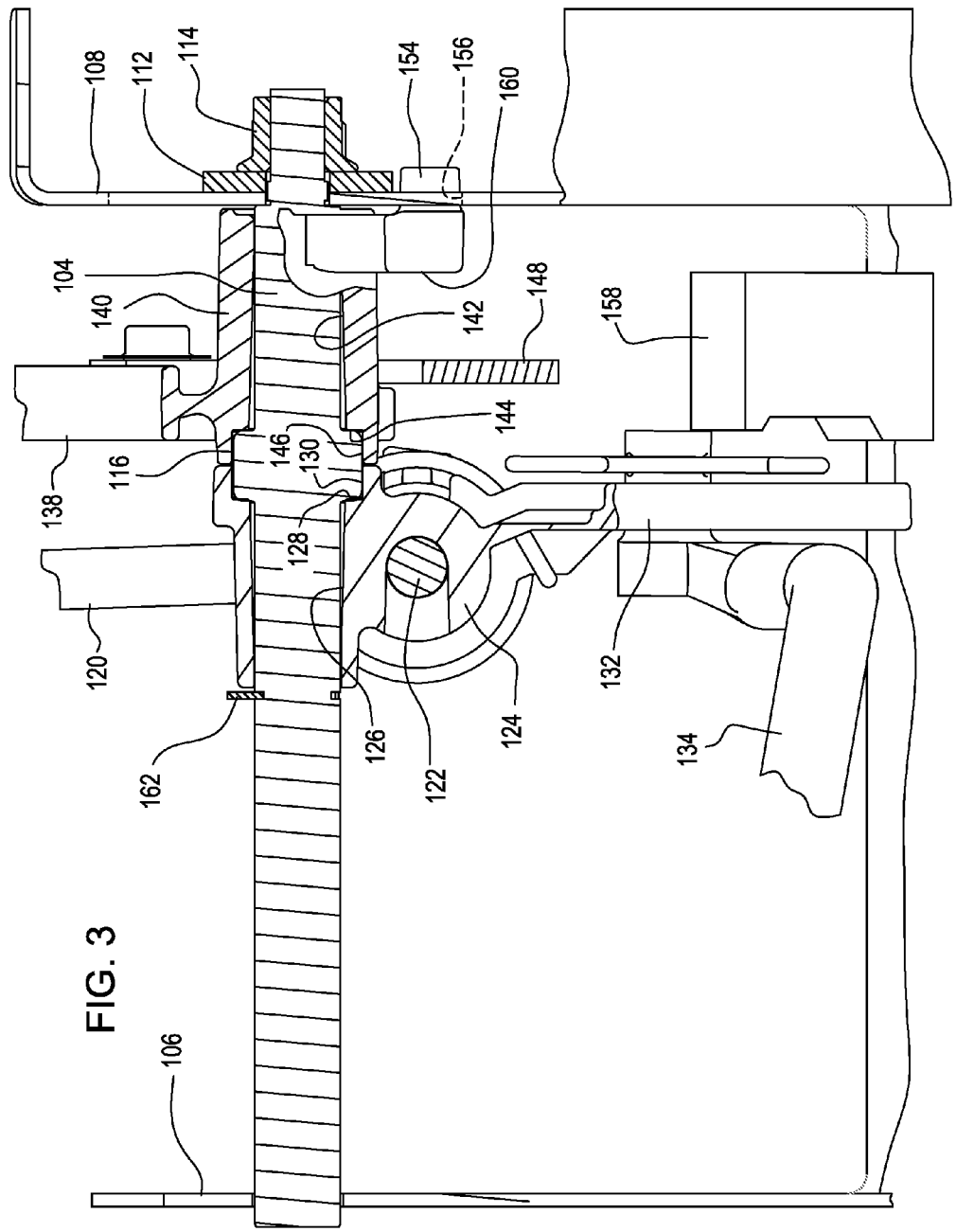
FIG. 3 is a cross section view of utility vehicle transmission controls having a common pivot shaft according to a preferred embodiment of the invention.

In the embodiment shown in FIGS. 1-3, shift lever 100 and differential lock lever 102 are transmission controls in a utility vehicle cab or operator's station, and may be mounted side by side to independently rotate or pivot on common pivot shaft 104. Shift lever 100 may be used to shift between high and low forward ranges, reverse, and neutral positions of a continuously variable transmission. Differential lock lever 102 may be used by an operator to lock or unlock the rear differential of the utility vehicle.

In one embodiment, common pivot shaft 104 may extend transversely across at least part of a utility vehicle cab or operator station, such as between left vertical side wall 106 and right vertical side wall 108 of form channel 110 positioned on or over a floor panel and at least partially between the vehicle's front seats. A first end of common pivot shaft 104 may be fastened by washer 112 and nut 114 to vertical side wall 108. The common pivot shaft may include integral collar 116 with a larger diameter than the rest of the pivot shaft. Each lever may independently pivot on the common pivot shaft. The integral collar is only one example of a spacing device on the shaft that helps maintain appropriate side by side spacing and alignment between the stepped sleeves of the shift lever and differential lock lever. Alternatively, various other spacing mechanisms may be used. For example, the common pivot shaft may be stepped or may include a groove or channel capturing a ring to separate the sleeves of the shift lever and differential lock lever.

In one embodiment, shift lever 100 may include shift grip 118 on a first or upper end of rod 120, and the rod may extend downwardly to a second or lower end 122 which may inserted through and engaged to shift pivot 124. The shift pivot may be a stepped sleeve, and may be a one piece member such as a casting, that may rotate or pivot on the axis of common pivot shaft 104. The shift pivot may include first sleeve portion 126 around the common pivot shaft, having a first internal diameter slightly larger than the outer diameter of the common pivot shaft, internal step 128, and second sleeve portion 130 with a second internal diameter slightly larger than the outer diameter of integral collar 116. The axial length of the second sleeve portion may be less than the axial length of the integral collar, and preferably about half the axial length of the collar. The shift pivot also may include arm 132 extending radially outwardly and downwardly from the rotational axis of the pivot shaft, and may be connected to shift rod linkage 134. For example, the shift rod linkage may be a shaft or push/pull cable connected to the transmission to select the vehicle direction, speed range, and number of traction drive wheels.

In one embodiment, differential lock lever 102 may include handle grip 136 on a first or upper end of differential lock arm 138. The second or lower end 140 of the differential lock arm may be a stepped sleeve pivotally mounted on common pivot shaft 104. The stepped sleeve may include first sleeve portion 142 having a first internal diameter slightly larger than the outer diameter of the common pivot shaft, internal step 144, and second sleeve portion 146 with a second internal diameter slightly larger than the outer diameter of integral collar 116. The axial length of the second sleeve portion may be less than the axial length of the integral collar, and preferably about half the axial length of the collar. Clip ring 162 may engage a groove in the common pivot shaft to hold shift pivot 124 onto the common pivot shaft.

In one embodiment, differential lock linkage strap 148 may extend radially outwardly from the pivot axis of the differential lock lever, and may be connected to differential lock cable 150 connected to the transaxle differential lock lever. Additionally, differential lock spring 152 may be connected between arm 148 and wall 108 of the form channel, to help bias the differential lock lever toward the unlocked position and toward the locked position. If the differential lock lever is pivoted rearwardly as shown in FIG. 1, the spring connected to the differential lock linkage strap may help bias the differential lock lever toward the locked position. If the differential lock lever is pivoted forwardly as shown in FIG. 2, the lever reaches an over center position so that the spring may help bias the lever toward the unlocked position.

In one embodiment, differential lock lever 102 may have stop 154 extending laterally from the rotational axis on arm 160, and the stop may ride in or follow slot 156. The stop and slot may limit travel of the differential lock lever between the locked and unlocked positions. Additionally, down stop 158 may be provided on the base of form channel 110 to provide a resilient body blocking the differential lock lever when the lever reaches the unlocked position.

Having described the preferred embodiment, it will become apparent that various modifications can be made without departing from the scope of the invention as defined in the accompanying claims.

The invention claimed is:

1. A utility vehicle transmission control assembly, comprising:
   a pivot shaft extending transversely across at least part of a utility vehicle operator station; the pivot shaft having an integral collar with an axial length;
   a shift lever having a first stepped sleeve pivotably mounted on the pivot shaft with a portion of the first stepped sleeve extending over and having an axial length less than the integral collar; and
   a differential lock lever having a lower end with a second stepped sleeve pivotably mounted on the pivot shaft with a portion of the second stepped sleeve extending over and having an axial length less than the integral collar so that the shift lever and differential lock lever independently pivot.

2. The utility vehicle transmission control assembly of claim 1 further comprising an arm extending radially outwardly from the first stepped sleeve of the shift lever, the arm connected to a shift rod linkage.

3. The utility vehicle transmission control assembly of claim 1 further comprising a stop extending laterally from the differential lock lever, the stop riding in a slot and limiting travel of the differential lock lever between a locked position and an unlocked position.

4. The utility vehicle transmission control assembly of claim 1 further comprising a strap extending radially outwardly from the pivot axis of the differential lock lever, the strap connected to a differential lock cable connected to a transaxle differential lock lever.

5. The utility vehicle transmission control assembly of claim 4 further comprising a spring connected to the strap helping bias the differential lock lever toward the unlocked position.

6. The utility vehicle transmission control assembly of claim 4 wherein the differential lock lever is in an over center position in the locked position.

7. A utility vehicle transmission control assembly, comprising:
   a common pivot shaft on which a shift lever and a differential lock lever are pivotably mounted side by side;
   each of the shift lever and the differential lock lever having an internally stepped sleeve around the common pivot shaft, at least one of the internally stepped sleeves having a first sleeve portion, a second sleeve portion that extends partially over an axial length of a spacer on the common pivot shaft and has a larger internal diameter than the first sleeve portion; and an arm extending radially outwardly from the sleeve.

8. The utility vehicle transmission control assembly of claim 7 wherein the common pivot shaft extends transversely between a first vertical side wall and a second vertical side wall of a form channel on a floor of an operator station.

9. The utility vehicle transmission control assembly of claim 8 further comprising a stop on the differential lock lever that rides in a slot in the second vertical side wall.

10. The utility vehicle transmission control assembly of claim 8 further comprising a spring between the differential lock lever and the second vertical side wall biasing the differential lock lever toward a locked position if the differential lock lever is pivoted in a first direction, and toward an unlocked position if the differential lock lever is pivoted in a second direction.

11. A utility vehicle transmission control assembly, comprising:
    a shift lever having a shift grip and a rod extending between the shift grip and a stepped sleeve;
    a differential lock lever having a handle grip on a first end and a stepped sleeve on a second end;
    a common pivot shaft on which the stepped sleeves are mounted to independently pivot; and
    an integral collar on the common pivot shaft separating the stepped sleeves;
    each of the stepped sleeves including a first sleeve portion and a second sleeve portion having a larger internal diameter than the first sleeve portion and extending partially over an axial length of the integral collar.

12. The utility vehicle transmission control assembly of claim 11 further comprising an arm extending radially outwardly from each of the stepped sleeves.

13. The utility vehicle transmission control assembly of claim 11 further comprising a spring attached to the arm of the stepped sleeve of the differential lock lever helping bias the differential lock lever toward a locked position and an unlocked position.

14. The utility vehicle transmission control assembly of claim 13 further comprising a stop extending from the stepped sleeve of the differential lock lever to limit travel of the differential lock lever beyond the locked position and the unlocked position.

* * * * *